INVENTORS
Frank Przybyla
Chien Hsia

United States Patent Office 3,764,389
Patented Oct. 9, 1973

3,764,389
METHOD OF PRODUCING A ZINC ALLOY POWDER AND AN ELECTRODE THEREFROM
Chien Hsia, 6 Bradfield Ave., and Franciszek Przybyla, 255 Glen Lake Ave., Apt. 2414, both of Toronto, Ontario, Canada
Filed Mar. 22, 1971, Ser. No. 126,481
Int. Cl. H01m 43/02
U.S. Cl. 136—31   9 Claims

ABSTRACT OF THE DISCLOSURE

An electrode of a zinc alloy powder, with the alloy particles individually amalgamated to assure diminished gassing from an electrode formed of the alloy powder in a compressed form for use in a battery, and the process for making the alloy powder.

Figure 1:
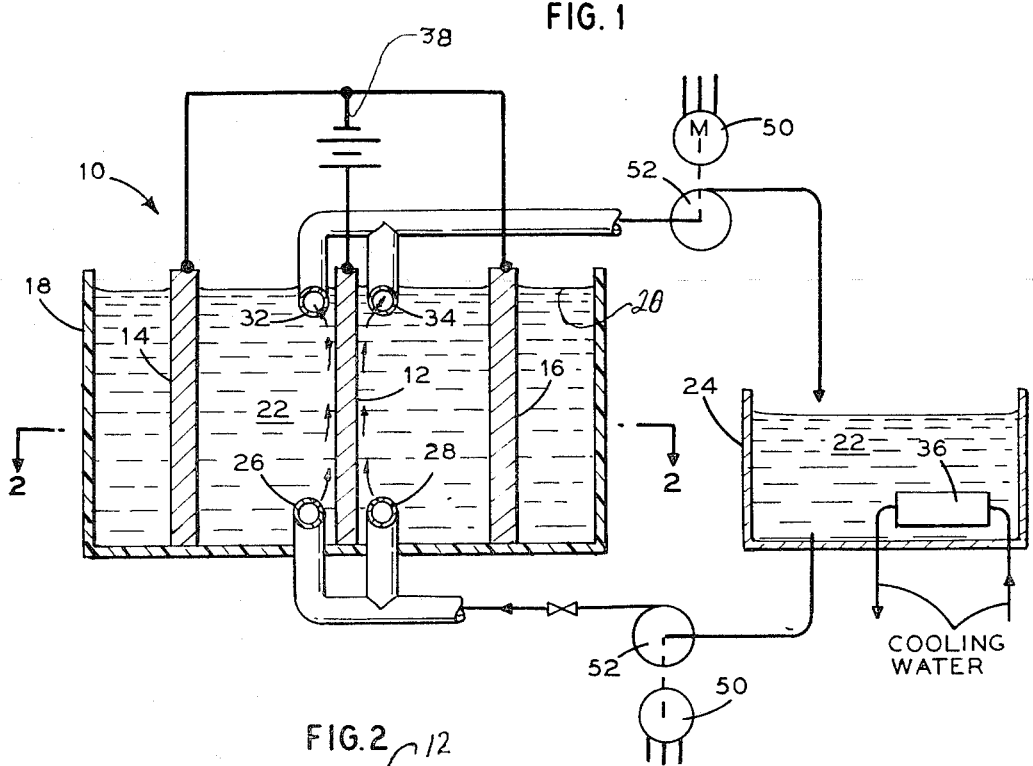

This invention relates to a highly porous electrode, and to a method of making it, which includes a method of producing a zinc alloy powder by electrodeposition, and of amalgamating said powder with mercury, and of forming such highly porous electrode therefrom.

Presently, zinc electrodes are formed from commercially available zinc powders obtained by the dispersion of liquid zinc in a cooling medium. Such powders can be compacted without the use of fillers into self-supporting electrodes, but of porosities only as high as 30%. We have found that zinc alloy powders of predetermined particle size, shape and chemical composition, can be obtained by electrodeposition, and can be compacted without the use of fillers into self-supporting electrodes of porosities as high as 75%. For both the commercially available and electrodeposited zinc alloy powders, compacting into electrodes is achieved by cold welding the powder particles by the application of pressure at ambient temperatures.

The corrosion of zinc electrodes in alkaline electrolyte causes evolution of hydrogen gas. During storage, the resultant gas pressure increase leads to structural deformation of cells, leakage of electrolyte, and other detrimental effects. It is therefore, of paramount importance to reduce hydrogen evolution in a cell to a rate acceptable for sealed galvanic cell design.

It is known in the art that amalgamation of zinc electrodes with mercury decreases the evolution of hydrogen. We have found that amalgamation of electrodeposited zinc along with mercury does not decrease the rate of hydrogen evolution to a level acceptable for sealed cell design. However, we have discovered that the rate of gas evolution can be reduced to such acceptable level by using a zinc alloy powder prepared by codepositing zinc with minor quantities of any member of a group of metals comprising lead, gallium, thallium and indium, and by amalgamating the resulting alloy with mercury to the same mercury content as the prior non-alloyed electrodeposited powder.

For example, the hydrogen evolution rate of prior electrodeposited zinc powder, subsequently amalgamated with 10% mercury, amounts to 370 microliters per gram per day; whereas, the rate of gas evolution of the electrodeposited zinc alloy powder of this invention, containing 0.04% of codeposited lead and subsequently amalgamated with the same 10% mercury, was only 70 microliters per gram per day.

It is a primary object of this invention to provide a non-dendritic zinc alloy powder of predetermined distribution of particle size and shape, which can be compacted without the use of fillers into self-supporting electrodes of porosities up to 75%.

It is a further object of this invention to provide a group of minor alloy components for zinc alloys to decrease the corrosion rate of zinc in alkaline solution.

It is a still further object of this invention to provide a method for obtaining said particulate zinc alloy having a predetermined content of the minor alloying component and predetermined distribution of particle size and shape.

We have found that there is a narrow concentration range of the minor alloying component which provides a reduced rate of hydrogen evolution acceptable for sealed cell design, e.g., for lead, 0.04% to 0.06% by weight. Said acceptable gassing rate is observed on a representative sample of zinc alloy powder only if the concentration of the minor alloying component in each of the particles falls into that given range. We have discovered that a uniform concentration distribution of that minor alloying component in each and all electrodeposited zinc particles, as well as the desired shaped and size distribution, can be achieved by controlling a number of interrelated parameters in the electrodeposition process.

Electrodeposition must be performed at a constant density which exceeds the limiting current density for both zinc and the minor alloying component. At said current density, the concentration of both deposited metals at the cathode surface is virtually nil and rises in the diffusion layer up to the concentration in the bulk of the electrolyte. The thickness of the diffusion layer is determined by natural convection, and by forced convection at a constant rate. We enforce flow of electrolyte parallel to the surface of the cathode at a predetermined rate. The ratio of zinc and lead ion concentrations in the electrolyte is kept constant by replenishing the amount of discharged ion in the electrolyte.

We have found that corrosion rates of the resulting zinc alloy are lowest if the electrodeposition is carried out in alkaline electrolyte. The electrolyte is an approximately 7 normal solution of potassium hydroxide or sodium hydroxide, serving the dual role of an ionically conductive medium and of a complexing agent for the zinc and the minor alloying component ions. Zinc ions in strongly alkaline solution form negatively charged zincate ions, while bivalent lead ions form plumbite ions. The concentration of the supporting electrolyte can be maintained at a lower level if additional complexing ions are used, e.g., cyanides or chelates.

The flow velocity of the electrolyte should be the same near all sites at which the alloy powder is deposited. This can be obtained by predetermined geometry of the electrodeposition cell, by equal distribution of the inflowing and outflowing electrolyte, and by maintaining a constant flow rate.

Since temperature affects chemical composition as well as size and shape distribution of the deposited particles, it is kept constant.

Particle size increases with increasing deposition time and is directly proportional to it, if the remaining parameters are kept constant. Therefore, removal of the deposit after a predetermined deposition time ensures a definite average particle size of the deposited powder.

Figure 2:
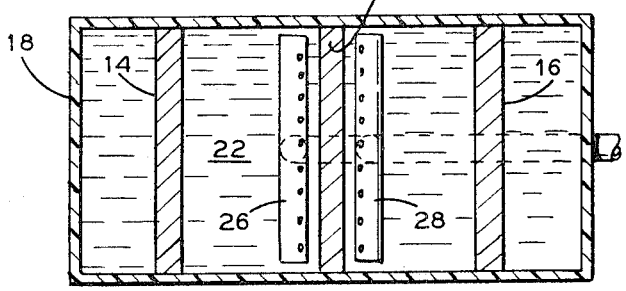
Figure 3:
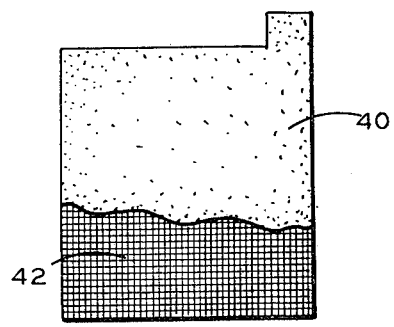

A simple arrangement of apparatus for preparing the electro-deposited particles, and a simple construction of an electrode made from those particles, are shown in the accompanying drawings, in which FIG. 1 is a vertical side elevational view of a deposition tank, with one side removed to illustrate schematically the location of the operating elements in the tank and the plumbing connections to an auxiliary tank in which the electrolyte is mixed and maintained in proper condition;

FIG. 2 is a top plan view of the arrangement shown in FIG. 1, to illustrate the disposition and construction of the lower manifold tubes in which the electrolyte is introduced into the tank adjacent the metal receiving anodes with a construction to provide a uniform sheet flow of the electrolyte parallel to receiving surfaces of the cathode; and FIG. 3 is a schematic view of an electrode formed by compression of the metal alloy particles, after amalgamation and cleaning, onto a metal support.

As shown generally in FIG. 1, an electrolytic system 10 is operated to form metal alloy particles by deposition which are then removed, washed, amalgamated with mercury, rewashed and compressed to size and shape on a suitable support. The system 10 includes a tank 18, which has disposed therein a rectangular graphite electrode 12 and two graphite counter electrodes 14 and 16 of equal dimensions are disposed in the rectangular polypropylene container 18, so that their lateral and lower edges are two inches apart and parallel, and touching the container walls. The upper edges of the electrodes extend two inches above the electrolyte top level 20. The electrolyte 22 is 40% potassium hydroxide solution containing 15 to 60 grams of zincate ions and from 0.1 to 0.05 gram of plumbite ions per liter. The total volume of electrolyte in the electrodeposition bath 22 is approximately ten liters. The electrolyte is circulated at a rate of ten liters per minute between the electrodeposition bath and a hundred liter auxiliary tank 24. The electrolyte enters the bath through two perforated manifolds 26 and 28 positioned laterally to cathode 12, and is removed through two equally positioned perforated manifolds 32 and 34 near the electrolyte level 20. Tap water is circulated through a cooling coil 36 immersed in the electrolyte to maintain a constant bath temperature of 25° C. Current density from a suitable current source 38 is held constant at one hundred milliamperes per square centimeter of cathode surface. During electrodeposition, zinc oxide and lead oxide are dissolved into the electrolyte in the auxiliary tank 24 at a rate equal to the rate of electrodeposition in the main tank. The zinc powder deposits on both sides of the cathode as highly porous layers of only slightly coherent particles. The powder is removed from the cathode at two hour intervals and placed into an alkaline potassium cyanide solution containing a quantity of mercuric cyanide large enough to assure a 10% mercury content of the zinc alloy powder. The powder is washed free from all foreign ions with deionized water, then rinsed with anhydrous methanol to remove excessive water, and subsequently vacuum dried.

The preceding example, gives a typical set of interrelated parameters required to obtain an amalgamated zinc alloy powder which corrodes at a gassing rate of twenty microliters per gram per day. It is understood that some of the parameters can be adjusted within a narrow range, provided other parameters are adjusted appropriately, to yield a powder of similar properties. Current density, for example, can be increased if accompanied by an appropriate increase in the concentration of the zincate ion. Temperature can be increased with a simultaneous decrease of the rate of electrolyte flow. The range of permissible changes will be determined by defining the desired properties of the end product, e.g., for this example, a hydrogen evolution rate of twenty microliters per gram per day, a porosity of 60% achieved by compacting with a pressure of nine hundred (900) pounds per square inch, a discharge efficiency of 80% obtained at a current density of one hundred (100) milliamperes per square centimeter at room temperature for a 60% porous electrode, et cetera.

In general, then, the following constitutes the permissible ranges of the various parameters of electrodeposition:

(1) Current density—100 to 200 milliamperes per square centimeter of electrode.

(2) Concentration in the electrolytic bath of alkali hydroxide—20% to 50% by weight.

(3) Concentration of zincate ions—1 to 20 grams per liter.

(4) Ratio of concentration of the minor alloying component in the electrolyte—0.0001 to 0.01 of zincate ion concentration.

(5) The velocity of flow of electrolyte parallel to the cathode surface—1 to 5 centimeters per second.

(6) Temperature—25° C. to 30° C.

(7) Electrodeposition time—0.25 hour to 2 hours.

In the given example, the cathode and both counter electrodes are composed of graphite. In practice, the graphite cathode can be replaced by a sheet of zinc or inert metal; the graphite anodes can be replaced by zinc sheet or particulate zinc contained in a basket. The high concentration of potassium hydroxide was chosen to avoid the need for additional complexing ions. However, electrodeposition can be carried out in solutions containing as little as 5% potassium hydroxide if a stoichiometric amount of cyanide, chelate, or other known complexing agent for zinc is present. Lead ions can be replaced by an equivalent amount of ions of gallium, indium or thallium. Shortening the time of deposition before removing the zinc alloy powder decreases particle size, resulting in a powder of larger surface area and smaller bulk density, thus facilitating compacting of electrodes of porosities higher than 60%.

Separate samples of commercially available zinc powder, and of the electrodeposited zinc alloy powder herein, were compacted into electrodes of porosities of 55% and weights of one gram. These electrodes were assembled into experimental zinc-mercuric oxide cells and discharged through a resistance of twenty-five (25) ohms at 0° C. Under these conditions, the cells containing electrodes made of the electrodeposited zinc alloy powder provided an average of 9.3 hours of service, while the cells containing zinc electrodes made of commercially available zinc powder performed only for an average of 4.7 hours. During discharge at −40° C. at a current density of ten milliamperes per square centimeter, cells containing electrodes made from the electrodeposited zinc alloy powder performed for an average of thirteen (13) hours, while cells containing electrodes made from commercially available zinc powder performed for an average of only eight (8) hours.

The electrode 40 thus formed, as schematically shown in FIG. 3, may be pressed onto any suitable base of metal 42 preferably having a grid structure to provide a support for the electrode material, and means for electrically or mechanically connecting the electrode to other associated conducting and supporting members.

The formation of the zinc alloy powder in protected amalgamated form permits the formation of electrodes of any suitable and desirable shape and size, with an assurance of highly efficient operation due to the high porosity and consequent large exposed area available for the electrochemical reaction.

By means of the process herein, pressing of zinc alloy electrodes permits porosities of 60% to 75%, without the use of filler, application of heat, or any other additional process, all of which is facilitated by particle size, shape, and resulting bulk density obtained by controlling the conditions of electrode-position.

The electrolyte transfer system is shown in simple schematic form, with an electric motor 50 driving a pump 52 in the inflow and outflow conduits for the desired rate of controlled flow to provide a smooth flow of the electrolyte upwardly along the cathode surfaces.

As indicated, the parameters may be varied within narrow ranges with suitable compensation by appropriate adjustment of other parameters, without departing from the spirit and scope of the invention as defined in the claims.

What is claimed is:

1. A process for making a high current density, highly porous, non-dendritic, amalgamated zinc alloy electrode comprising the steps of:

forming a zinc alloy powder essentially consisting of zinc and a minor alloying metal component comprising a metal selected from the group consisting of lead, gallium, thallium, and indium;

electrodepositing said zinc alloy powder in an alkaline bath wherein the powder so formed is kept within a particle size that will limit and prevent dendritic formation;

removing the electrodeposited non-dendritic zinc alloy from said bath and amalgamating same with mercury;

washing and drying said amalgamated non-dendritic zinc alloy powder;

compressing said amalgamated non-dendritic zinc alloy powder at ambient temperature into a self-supporting electrode having a porosity of up to 75% thereof.

2. The process of claim 1, in which
said bath includes a caustic solution and the zinc and the alloy metal are each in a compound form soluble in said caustic solution.

3. The process of claim 2, in which
said zinc is in zincate form, the alloy metal is in oxide form, and the bath is an alkali hydroxide.

4. The process of claim 3, in which
said bath is sodium hydroxide.

5. The process of claim 3, in which
said bath is potassium hydroxide.

6. The process of claim 1, in which
said electro-deposition process is controlled to hold the concentration range of the minor alloying component of metal within the limits of 0.04% to 0.06% by weight of the alloy powder.

7. The process of claim 6, in which
said bath is moved progressively, uniformly and linearly along a receiving surface of an electrode in said bath onto which the deposition is to be accomplished.

8. The process of claim 1, in which
the conditions of electrodeposition are controlled to be specified by:

(1) current density 100 to 200 milliampers per square centimeter of electrode;
(2) concentration in the electrolytic bath of alkali hydroxide 20% to 50% by weight;
(3) concentration of zincate ions 1 to 20 grams per liter;
(4) ratio of concentration of the minor alloying component in the electrolyte 0.0001 to 0.001 of zincate ion concentration;
(5) the velocity of flow of electrolyte parallel to the cathode surface mounting to 1 to 5 centimeters per second;
(6) temperature 25° C. to 30° C.; and
(7) electrodeposition time 0.25 hour to 2 hours.

9. The process of claim 1 in which said minor alloying ingredient constitutes a mass fraction range of 0.0002 to 0.008 of the zinc alloy powder.

References Cited
UNITED STATES PATENTS

| | | | |
|---|---|---|---|
| 3,623,911 | 11/1971 | Oswin | 136—83 |
| 3,226,260 | 12/1965 | Drengler | 136—30 |
| 3,069,486 | 12/1962 | Solomon et al. | 136—30 |
| 3,071,638 | 1/1963 | Clark et al. | 136—125 |
| 3,326,783 | 6/1967 | Winter | 204—10 |
| 2,655,472 | 10/1953 | Hilliard et al. | 204—10 |
| 2,727,083 | 12/1955 | Hollman et al. | 136—30 |
| 2,982,806 | 5/1961 | Voss | 136—30 |
| 3,553,027 | 1/1971 | Oswin et al. | 136—30 |
| 3,580,740 | 5/1971 | James | 136—30 |

ANTHONY SKAPARS, Primary Examiner

U.S. Cl. X.R.

136—126